US012791928B2

(12) United States Patent
Tsuji et al.

(10) Patent No.: US 12,791,928 B2
(45) Date of Patent: Nov. 10, 2026

(54) LIGHT SOURCE DEVICE AND DISPLAY DEVICE

(71) Applicant: Nichia Corporation, Anan (JP)

(72) Inventors: Tomotoshi Tsuji, Suwa-gun (JP); Wataru Kitahara, Kamiina-gun (JP); Takashi Sasamuro, Chino (JP)

(73) Assignee: Nichia Corporation, Anan (JP)

( * ) Notice: Subject to any disclaimer, the term of this patent is extended or adjusted under 35 U.S.C. 154(b) by 223 days.

(21) Appl. No.: 18/891,773

(22) Filed: Sep. 20, 2024

(65) Prior Publication Data

US 2025/0102896 A1 Mar. 27, 2025

(30) Foreign Application Priority Data

Sep. 26, 2023 (JP) ................................ 2023-162461

(51) Int. Cl.
*G03B 21/20* (2006.01)
*G02B 27/48* (2006.01)

(52) U.S. Cl.
CPC ..... *G03B 21/2073* (2013.01); *G03B 21/2013* (2013.01); *G03B 21/2033* (2013.01); *G03B 21/2066* (2013.01); *G03B 21/208* (2013.01)

(58) Field of Classification Search
CPC ............ G03B 21/2033; G03B 21/2013; G03B 21/2073; G03B 21/2066; G02B 27/106; G02B 27/10; G02B 27/144; G02B 27/48
See application file for complete search history.

(56) References Cited

U.S. PATENT DOCUMENTS

| | | | |
|---|---|---|---|
| 2001/0019530 A1 | 9/2001 | Saitoh et al. |
| 2005/0153478 A1 | 7/2005 | Yoshida et al. |
| 2006/0226432 A1 | 10/2006 | Nemoto |
| 2009/0086769 A1 | 4/2009 | Minamio et al. |

FOREIGN PATENT DOCUMENTS

| | | | |
|---|---|---|---|
| JP | 2000-294867 A | | 10/2000 |
| JP | 2001-244542 A | | 9/2001 |
| JP | 2001-250254 A | | 9/2001 |
| JP | 2002-197707 A | | 7/2002 |
| JP | 2003-031887 A | | 1/2003 |
| JP | 2004188604 A | * | 7/2004 |
| JP | 2004-220675 A | | 8/2004 |
| JP | 2004-273908 A | | 9/2004 |
| JP | 2009-088066 A | | 4/2009 |

* cited by examiner

*Primary Examiner* — Ryan D Howard
(74) *Attorney, Agent, or Firm* — Kim & Stewart LLP

(57) ABSTRACT

A light source device includes a substrate, a laser element on a main surface of the substrate and configured to emit laser light, an optical element on the main surface of the substrate and in an optical path of the laser light, and a polarization element on the optical element. The optical element has a first surface that reflects in a first direction a first component of the laser light incident onto the optical element from the laser element, and a second surface that reflects in the first direction a second component of the laser light incident onto the optical element from the laser element and transmitted through the first surface. The first component of the laser light reflected by the first surface is not transmitted through the polarization element and the second component of the laser light reflected by the second surface is transmitted through the polarization element.

20 Claims, 8 Drawing Sheets

LIGHT SOURCE DEVICE AND DISPLAY DEVICE

CROSS-REFERENCE TO RELATED APPLICATIONS

The present application claims priority under 35 U.S.C. § 119 to Japanese Patent Application No. 2023-162461, filed Sep. 26, 2023, the entire contents of which are hereby incorporated by reference.

TECHNICAL FIELD

The present disclosure relates to a light source device and a display device.

BACKGROUND

A light source device that emits laser light and a display device such as a projector including the light source device are known. For example, Japanese Patent Publication No. 2001-244542 discloses a configuration in which light from a semiconductor laser element is emitted through a micro prism in order to downsize a semiconductor laser device.

SUMMARY

In a light source device that emits laser light, speckle reduction is desirable. One method for reducing speckles is to use laser lights having different polarization states.

An object of one or more embodiments according to the present disclosure is to provide a light source device that is compact and capable of emitting laser lights having different polarization states.

A light source device according to an embodiment of the present disclosure includes a substrate; a laser element disposed on a main surface of the substrate and configured to emit laser light; an optical element disposed on the main surface of the substrate and in an optical path of the laser light; and a polarization element disposed on the optical element. The optical element has a first surface that reflects in a first direction a first component of the laser light incident onto the optical element from the laser element, and a second surface that reflects in the first direction a second component of the laser light incident onto the optical element from the laser element and transmitted through the first surface. The first component of the laser light reflected by the first surface is not transmitted through the polarization element and the second component of the laser light reflected by the second surface is transmitted through the polarization element.

One or more embodiments according to the present disclosure can provide the light source device that is compact and capable of emitting laser lights having different polarization states.

DETAILED DESCRIPTION

Figure 1:
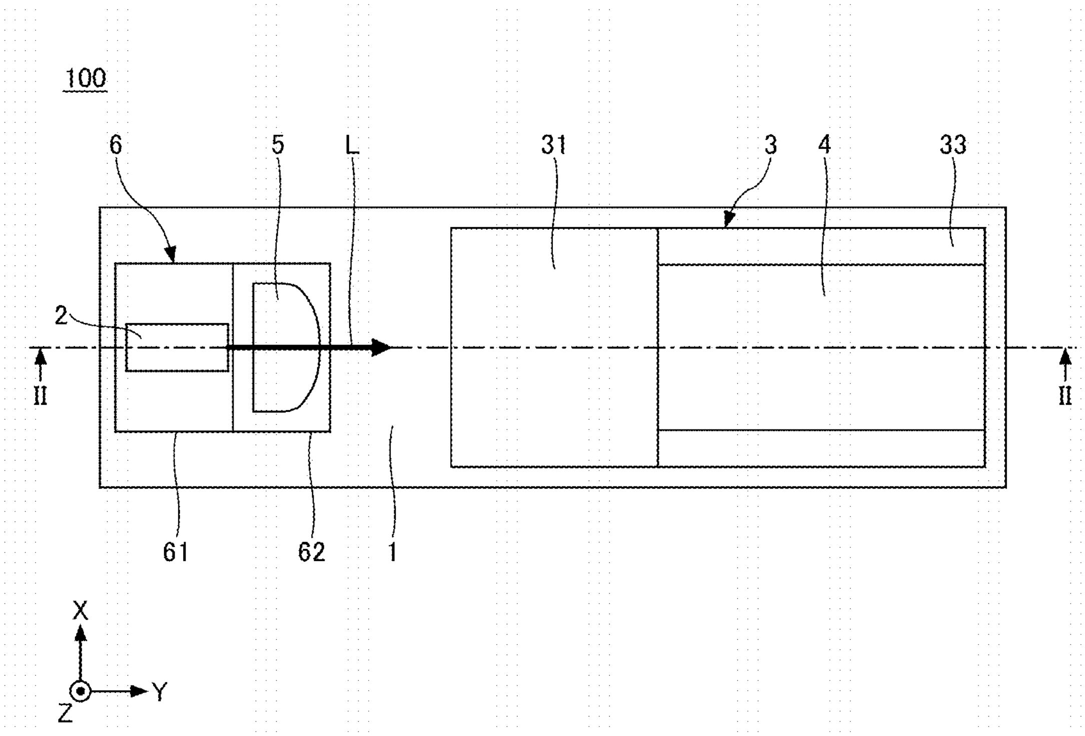
FIG. 1 schematically illustrates a top view of a light source device according to a first embodiment.

A light source device and a display device according to embodiments of the present disclosure will be described in detail with reference to the accompanying drawings. The aspects illustrated bellow are examples of the light source device and the display device to embody the technical concepts of the present disclosure, and are not limited to the following. Further, dimensions, materials, shapes, relative arrangements, or the like of constituent members described in the embodiments are not intended to limit the scope of the present disclosure thereto, unless otherwise specified, and are merely exemplary. It is noted that the size, positional relationship, or the like of members illustrated in each of the drawings may be exaggerated for clarity of description. Further, in the following description, members having the same terms and reference signs represent the same members or members of the same quality, and a detailed description of these members will be omitted as appropriate. As a cross-sectional view, an end view illustrating only a cut surface may be used.

Each of the drawings uses an orthogonal coordinate system in which X-, Y-, and Z-axes are used as directional expressions. X-, Y- and Z-axes are orthogonal to each other. In the X-axis direction along the X-axis, the side the arrow points to is denoted as the +X side, and the opposite side of the +X side is denoted as the −X side. In the Y-axis direction along the Y-axis, the side the arrow points to is denoted as the +Y side, and the opposite side of the +Y side is denoted as the −Y side. In the Z-axis direction along the Z-axis, the side the arrow points to is denoted as the +Z side, and the opposite side of the +Z side is denoted as the −Z side.

The +Z side is referred to as the "upper" side, and the −Z side as the "Lower" side. A plan view refers to a view of a target surface from a normal direction of the target surface. A plan view of an object means a view of the object in a plan view. These terms indicating particular directions and positions are merely used to facilitate understanding of relative directions or positions in the referenced drawings. These expressions for directions do not limit the orientations of the light source device and the display device of the embodiments during use, and the light source device and the display device of the embodiments may be disposed in any orientation during use.

In the embodiments described bellow, the phrase "along the X-, Y-, or Z-axis" means that an object is tilted within a range of ±10 degrees with respect to each axis. In the embodiments, "orthogonal" and "perpendicular" may each include an error within ±10 degrees relative to 90 degrees. The rotation of 90 degrees may include an error within ±10 degrees.

In the present specification or appended claims, when there are a plurality of constituent components and it is desired to denote those components individually, the components may be distinguished by adding terms such as "first," "second," and the like in front of terms of the components. Objects to be distinguished may differ between the present specification and the claims. Thus, even when a component in the claims is given the same term as that in the present specification, the object identified by that component is not the same across the present specification and the claims in some cases.

First Embodiment

Figure 2:
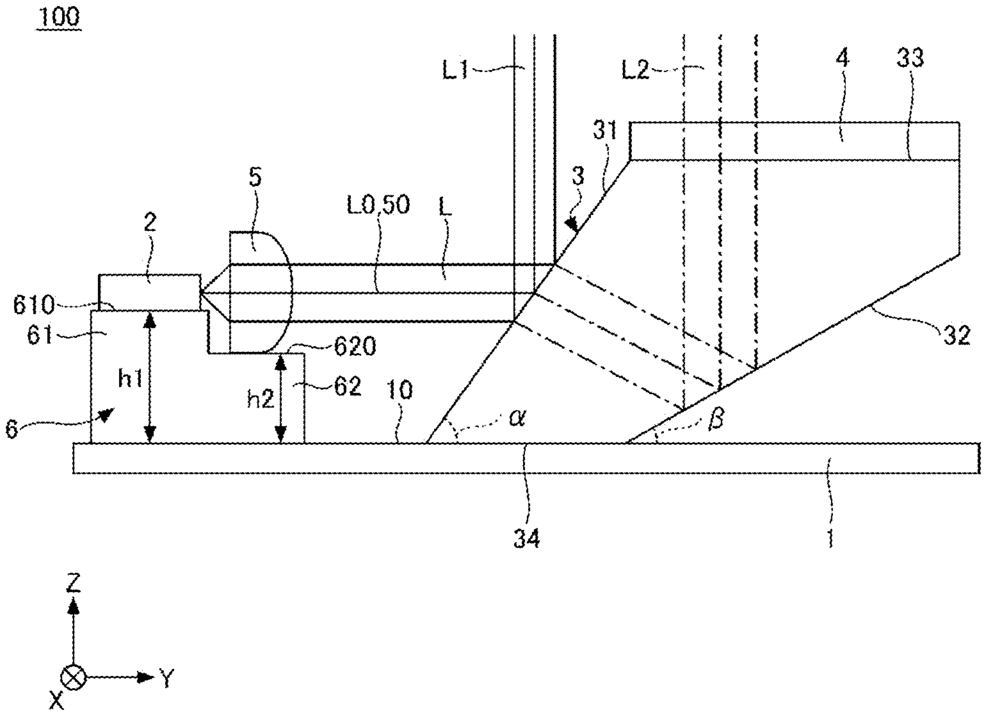
FIG. 2 schematically illustrates a first example of a cross-sectional view taken along line II-II in FIG. 1.

A light source device according to a first embodiment is described with reference to FIGS. 1 and 2. FIG. 1 schematically illustrates a top view of a light source device 100 according to the first embodiment. FIG. 2 schematically illustrates a first example of a cross-sectional view taken along line II-II in FIG. 1.

First Example

The light source device 100 includes a substrate 1, a laser element 2 that is disposed on a main surface 10 of the substrate 1 and emits laser light L, an optical element 3 that is disposed on the main surface 10 of the substrate 1 and in an optical path of the laser light L, and a polarization element 4 disposed on the optical element 3. The optical element 3 has a first surface 31 that reflects upward a first component L1 of the laser light L incident onto the optical element 3 from the laser element 2, and a second surface 32 that reflects upward a second component L2 of the laser light L incident onto the optical element 3 from the laser element 2 and transmitted through the first surface 31. The light source device 100 emits the first component L1 of the laser light L not transmitted through the polarization element 4 and the second component L2 of the laser light L transmitted through the polarization element 4.

In the example illustrated in FIGS. 1 and 2, the laser element 2 emits the laser light L to the +Y side. The first surface 31 of the optical element 3 reflects the first component L1 of the laser light L upward (toward the +Z side). That is, the light source device 100 emits upward the first component L1 reflected by the first surface 31 and not transmitted through the polarization element 4. On the other hand, the second surface 32 of the optical element 3 reflects upward the second component L2 of the laser light L transmitted through the first surface 31. The second component L2 reflected by the second surface 32 is transmitted through the polarization element 4. That is, the light source device 100 emits upward the second component L2, which has been reflected by the second surface 32 and transmitted through the polarization element 4 to have a polarization state different from that of the first component L1. As described above, the light source device 100 can emit upward the first component L1 and the second component L2 having different polarization states.

In a case in which the polarization state of a component of the laser light is different from the polarization state of the other component of the laser light, optical combination of the laser light can reduce interference compared with the case in which the entire components of the laser light has a uniform polarization state. This reduces speckles generated by interference between scattered laser lights. For example, when a component of the laser light is S-polarized and the other component of the laser light is P-polarized and the light amount is substantially the same for the S-polarized light and the P-polarized light, the speckles are particularly reduced compared with the case in which the entire components of the laser light has a uniform polarization state. For example, the speckles are reduced by about 15% to 25% compared with the case in which the entire components of the laser light is S-polarized or P-polarized.

The light source device 100 emits the first component L1 and the second component L2 having different polarization states. Accordingly, the light source device 100 emits polarization-combined components of the laser light L to reduce the speckles compared with the case in which the entire components of the laser light L has a uniform polarization state. Since the optical path lengths of the first component L1 and the second component L2 are different in the light source device 100, the speckles can also be reduced by time multiplexing. The light source device 100 emits the first component L1 and the second component L2 having different polarization states based on the first component L1 and the second component L2 that have been branched using the optical element 3. The optical element 3 is a single structure and can therefore be downsized. Thus, the light source device 100 can be downsized when using the optical element 3. Accordingly, the present embodiment can provide the light source device 100 that is compact and capable of reducing the speckles.

For example, in the light source device 100, when the first component L1 is S-polarized and the second component L2 is P-polarized and the amount of light is substantially the same for the first component L1 and the second component L2, the speckles can be particularly reduced compared with the case in which the entire components of the laser light L has a uniform polarization state. However, the combination of the first component L1 and the second component L2 is not limited to the combination of the P-polarized light and the S-polarized light as long as the polarization states are different from each other. For example, the combination of the first component L1 and the second component L2 may be a combination of linearly polarized lights that are not orthogonal to each other, a combination of linearly polarized light and circularly or elliptically polarized light, or a combination of elliptically polarized lights having different long-axis directions.

In the example illustrated in FIGS. 1 and 2, an acute angle (i.e., the smaller angle) formed by the first surface 31 of the optical element 3 and the main surface 10 of the substrate 1 is a first angle $\alpha$. An acute angle (i.e., the smaller angle) formed by the second surface 32 of the optical element 3 and the main surface 10 of the substrate 1 is a second angle $\beta$ smaller than the first angle $\alpha$. As described above, the optical element 3 is a single structure and can be downsized easily. In the present embodiment, the optical element 3 is used and only the second component L2 extracted from the optical element 3 is transmitted through the polarization element 4, whereby the light source device 100 that is compact and capable of emitting the first component L1 and the second component L2 having different polarization states in substantially the same direction can be provided. Since the refraction angle of the laser light L on the first surface 31 varies depending on the wavelength of the laser light L, the second angle $\beta$ may be appropriately changed in accordance with the wavelength of the laser light L.

In the example illustrated in FIGS. 1 and 2, the light source device 100 further includes a lens 5 disposed between the laser element 2 and the optical element 3. For example, the lens 5 substantially parallelizes (collimates) the laser light L emitted from the laser element 2. This reduces the amount of light that leaks without entering the optical element 3, out of the laser light L emitted from the laser element 2, thereby increasing the efficiency of laser light emission from the light source device 100. In addition, by decreasing the spread of the laser light L emitted from the laser element 2, the optical element 3 can be downsized.

In the example illustrated in FIGS. 1 and 2, the light source device 100 further includes a support member 6 disposed on the main surface 10 of the substrate 1 and supporting each of the laser element 2 and the lens 5. The support member 6 includes a first region 61 in which the laser element 2 is disposed and a second region 62 in which the lens 5 is disposed. In the normal direction (Z direction) of the main surface 10, a first height h1 of a first upper surface 610 of the first region 61 with respect to the main surface 10 and a second height h2 of a second upper surface 620 of the second region 62 with respect to the main surface 10 are adjusted such that the central axis L0 of the laser light L emitted from the laser element 2 is aligned with the optical axis 50 of the lens 5. This configuration allows the laser light L from the laser element 2 to be efficiently extracted through the lens 5, thus increasing the efficiency of laser light emission from the light source device 100. Here, the alignment of the central axis L0 of the laser light L and the optical axis 50 of the lens 5 includes a case in which the misalignment therebetween is within a range of ±50 μm with respect to the Z direction. In FIG. 2, since the central axis L0 of the laser light L and the optical axis 50 of the lens 5 overlap with each other, the reference signs of both of them are illustrated.

Substrate 1

The substrate 1 is a plate-shaped member having a substantially rectangular shape in a top view. Various elements can be disposed on the main surface 10 of the substrate 1. The substrate 1 includes a resin material, a metal material, or the like. From the viewpoint of increasing the heat dissipation efficiency of heat generated by the laser element 2, the substrate 1 is preferably formed with a material having a high thermal conductivity. For example, a material such as copper, aluminum, graphene, aluminum nitride, or silicon can be used as the material of the substrate 1.

Laser Element 2

The laser element 2 is disposed on the main surface 10 of the substrate 1. It is regarded that the laser element 2 is disposed on the main surface 10 of the substrate 1, even when the support member 6, which is described below in detail, is disposed between the laser element 2 and the substrate 1. As the laser element 2, a semiconductor laser element that emits laser light with an oscillation peak wavelength in a range from 420 nm to 495 nm can be used, for example. However, as the laser element 2, one that emits the laser light L with an oscillation peak wavelength in a visible light range from 380 nm to 780 nm may be used, or one that emits the laser light L with an oscillation peak wavelength in an invisible light range such as an infrared light range or an ultraviolet light range may be used. In the example illustrated in FIGS. 1 and 2, the laser element 2 emits the laser light L which is a linearly polarized light and propagates toward the lens 5.

For example, a material including a nitride semiconductor is preferably used for the laser element 2. The nitride semiconductor includes at least one of GaN, InGaN, and AlGaN, for example. For the laser element 2, materials such as GaAs, AlGaInP, InGaAsP, or AlGaAs can be used. The laser element 2 is fixed to the first upper surface 610 of the first region 61 of the support member 6 using an adhesive member, a screw member, or the like.

The laser element 2 may be an edge-emitting laser element, a vertical-cavity surface-emitting laser element, or a photonic crystal surface-emitting laser element.

Optical Element 3

The optical element 3 includes glass, crystal, or the like having transmissivity for the laser light L emitted from the laser element 2. The optical element 3 is, for example, a prism. For the transmissivity of the optical element 3, it preferably has a transmittance of 60% or more with respect to the laser light L emitted from the laser element 2. The optical element 3 is disposed such that a lower surface 34 of the optical element 3 faces the main surface 10 of the substrate 1, and is fixed to the main surface 10 of the substrate 1 with a bonding member (for example, AuSn), solder, an adhesive member, or the like. From the viewpoint of increasing the heat dissipation efficiency, it is preferable to provide a metal film on the lower surface 34 of the optical element 3, that is, the surface facing the substrate 1 when the optical element 3 is fixed to the substrate 1.

In the example illustrated in FIGS. 1 and 2, the first surface 31 of the optical element 3 is a mirror having a predetermined reflectance, and the second surface 32 of the optical element 3 is either a total reflection mirror or a dichroic mirror. This configuration allows adjustment of the light amounts of the first component L1 and the second component L2 having different polarization states by previously adjusting the reflectance of the first surface 31. For example, the transmittance for the laser light L at the first surface 31 is higher than the reflectance for the laser light L at the first surface 31. This allows adjustment of the light amounts of the first and second components, taking into account losses due to the propagation of the laser light inside the optical element 3 and losses at the second surface, for example. The first surface 31 may be provided with, for example, a dielectric multilayer film. For example, the transmittance of the first surface 31 at the wavelength of the laser light L may be in a range from 50% to 60%, and the reflectance thereof may be in a range from 40% to less than 50%.

In the example illustrated in FIGS. 1 and 2, the second surface 32 of the optical element 3 is provided with a metal film or a dielectric multilayer film. This configuration can improve the reflectance of the second component L2 at the second surface 32. When the transmittance for the laser light at the first surface is greater than the reflectance for the laser light at the first surface, the light amounts of the first component L1 and the second component L2 having different polarization states can be brought balanced. The second surface 32 of the optical element 3 is preferably provided with a dielectric multilayer film. This improves the reflectance and reduces the absorptance with respect to the wavelength of the laser light. The reflectance of the second surface 32 at the wavelength of the laser light may be, for example, 80% or more, 90% or more, or 95% or more. The reflectance of the second surface 32 is less than 100%.

Polarization Element 4

The polarization element 4 can change the polarization state of incident light. The polarization element 4 includes a crystal having transmissivity for the laser light L emitted from the laser element 2. The polarization element 4 may be made of, for example, quartz crystal or mica. For the transmissivity of the polarization element 4, it preferably has a transmittance of 90% or more, 95% or more, or 98% or more with respect to the laser light L emitted from the laser element 2. The polarization element 4 is disposed on an upper surface 33 of the optical element 3 and is fixed to the upper surface 33 with an adhesive member or the like.

In the example illustrated in FIGS. 1 and 2, the polarization element 4 is a half-wave plate. The polarization element 4 is disposed such that the optical axis of the polarization element 4 is inclined at approximately 45 degrees with respect to the polarization direction of the laser light L which is linearly polarized light. This allows the polarization element 4 to turn the polarization direction of the second component L2 incident on the polarization element 4 by 90 degrees with respect to the polarization direction of the first component L1, making the polarization direction of the first component L1 be orthogonal to the polarization direction of the second component L2. The light source device 100 can emit, for example, the first component L1 that is S-polarized and the second component L2 that is P-polarized.

The use of the half-wave plate as the polarization element 4 can change the polarization direction of the polarized light incident on the polarization element 4. This allows the light source device 100 to have high emission efficiency of the first component L1 and the second component L2, which are linearly polarized lights with different polarization directions. The light source device 100 can preferably reduce the speckles by turning the polarization direction of the second component L2 by 90 degrees with respect to the polarization direction of the first component L1 with use of the polarization element 4. However, the tilt angle of the optical axis of the polarization element 4 with respect to the polarization direction of the laser light L is not limited to 45 degrees, but can be changed as needed. The polarization element 4 is not limited to the half-wave plate as long as it can change the polarization state of the incident light. The polarization element 4 may be a quarter-wave plate.

Lens 5

The lens 5 can be a plano-convex single lens, a biconvex single lens, a meniscus single lens, a Fresnel lens, a diffraction-type lens, a coupling lens composed of multiple single lenses, or the like, which includes a glass material or a crystal having transmissivity for the laser light L emitted from the laser element 2. The lens 5 may be made of synthetic quartz, for example. For the transmissivity of the lens 5, it preferably has a transmittance of 90% or more, 95% or more, or 98% or more with respect to the laser light L emitted from the laser element 2. The lens 5 may include at least a spherical lens or an aspherical lens. The type, arrangement, shape, or the like of the lens 5 can be appropriately changed in accordance with the specifications or the like of the light source device 100. The lens 5 is fixed to the second upper surface 620 of the second region 62 of the support member 6 with an adhesive member or the like.

When the lens 5 is provided, the laser element 2 is preferably an edge-emitting laser element or a vertical-cavity surface-emitting laser element, and more preferably an edge-emitting laser element. This is because the lens 5 achieves a greater collimating effect than other laser elements.

Support Member 6

The support member 6 includes a ceramic material, a metal material, or the like. From the viewpoint of increasing the heat dissipation efficiency of the heat generated by the laser element 2, the support member 6 preferably includes a material having a high thermal conductivity. For example, copper, aluminum, graphene, aluminum nitride, silicon, or the like can be used as the material of the support member 6. The support member 6 is disposed such that the lower surface of the support member 6 faces the main surface 10 of the substrate 1 and is fixed to the substrate 1 with an adhesive member or the like. The support member 6 and the substrate 1 may be made as separate bodies with different materials, may be made as separate bodies with the same material, or may be integrated.

Second Example

Figure 3:
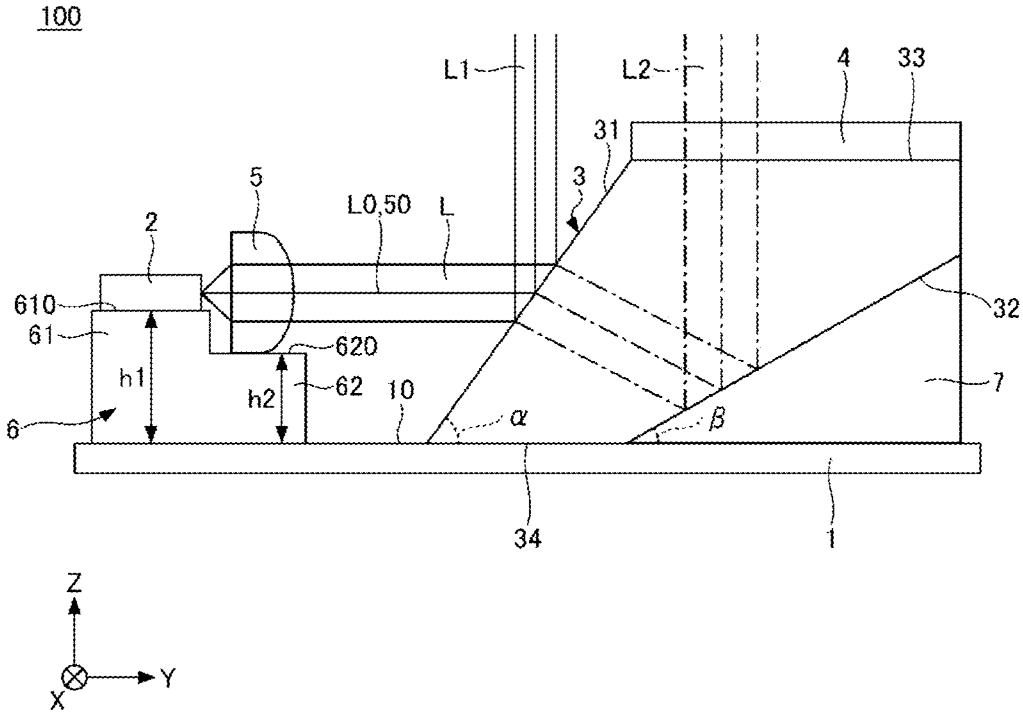
FIG. 3 schematically illustrates a second example of the cross-sectional view taken along line II-II in FIG. 1.

FIG. 3 schematically illustrates a second example of the cross-sectional view taken along line II-II in FIG. 1. The second example differs from the first example in that the light source device 100 includes an optical element support member 7.

The optical element support member 7 includes glass, a metal material, or the like. The optical element support member 7 is disposed so as to fill a gap (may be referred to as a gap space) between the main surface 10 of the substrate 1 and the second surface 32 of the optical element 3 disposed on the main surface 10. By providing the optical element support member 7 in the light source device 100, the optical element 3 can be stably positioned on the main surface 10 of the substrate 1 so as not to move.

Second Embodiment

A light source device according to a second embodiment is described. The same names and symbols as those in the previously described embodiment indicate the same members or configurations or members or configurations of the same quality, and detailed explanations thereof are omitted as appropriate. This also applies to the embodiments that will be described hereinafter.

Figure 4:
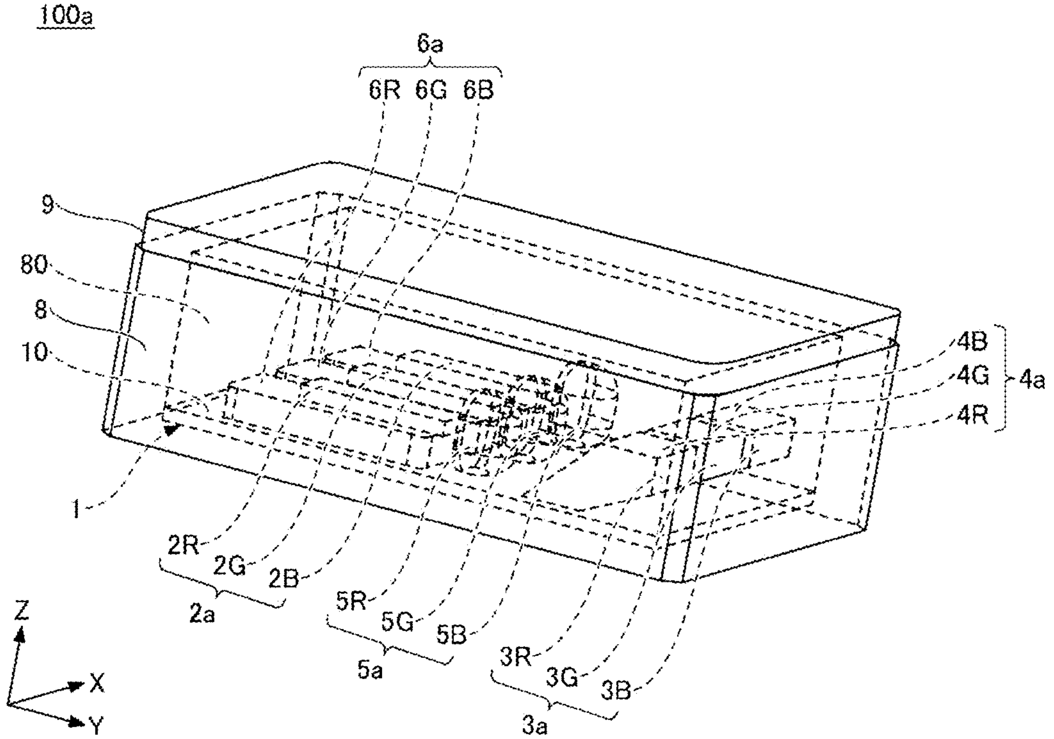
FIG. 4 schematically illustrates a perspective view of a light source device according to a second embodiment.

FIG. 4 schematically illustrates a perspective view a light source device 100*a* according to the second embodiment. The light source device 100*a* differs from the light source device of the first embodiment in that the light source device 100*a* includes a plurality of laser elements 2*a*, a plurality of optical elements 3*a*, a plurality of polarization elements 4*a*, a plurality of lenses 5*a*, and a plurality of support members 6*a*. The light source device 100*a* also differs from the light source device of the first embodiment in that the light source device 100*a* includes a housing member 8 that houses the laser elements 2*a* and the optical elements 3*a*, and a lid 9 that seals the housing member 8.

The plurality of laser elements 2*a* include a laser element 2R, a laser element 2G, and a laser element 2B. The laser element 2R emits red laser light. As the laser element 2R, a laser element that emits laser light with an oscillation peak wavelength in a range from 605 nm to 750 nm can be used. The laser element 2G emits green laser light. As the laser element 2G, a laser element that emits laser light with an oscillation peak wavelength in a range from 495 nm to 570 nm can be used. The laser element 2B emits blue laser light. As the laser element 2B, a laser element that emits laser light with an oscillation peak wavelength in a range from 420 nm to 495 nm can be used.

The plurality of optical elements 3*a* include an optical element 3R, an optical element 3G, and an optical element 3B. The optical element 3R is disposed on the main surface 10 of the substrate 1 and in the optical path of the red laser light from the laser element 2R. The optical element 3G is disposed on the main surface 10 of the substrate 1 and in the optical path of the green laser light from the laser element 2G. The optical element 3B is disposed on the main surface 10 of the substrate 1 and in the optical path of the blue laser light from the laser element 2B. The angle β between the second surface 32 of each of the optical elements 3R, 3G, and 3B and the main surface 10 of the substrate 1 is adjusted in accordance with the wavelength of light incident on each of the optical elements 3R, 3G, and 3B, and therefore may be different among the optical elements 3R, 3G, and 3B. For example, the angle β is an angle at which light is reflected by the second surface 32 in a direction perpendicular to the main surface 10 of the substrate 1, taking the wavelength of the light and the refractive index of the optical element into consideration. In a specific implementation, the angle β of the optical element 3R is larger than the angle β of the optical element 3G, and the angle β of the optical element 3G is larger than the angle β of the optical element 3B. In such cases, beam diameters of the second components of the red, green, and blue laser lights that exit out of the polarization elements 4*a* may be different from each other.

The plurality of polarization elements 4*a* include a polarization element 4R, a polarization element 4G, and a polarization element 4B. The polarization element 4R is disposed on the optical element 3R. The polarization element 4G is disposed on the optical element 3G. The polarization element 4B is disposed on the optical element 3B.

The plurality of lenses 5*a* include a lens 5R, a lens 5G, and a lens 5B. The lens 5R is disposed between the laser element 2R and the optical element 3R. The lens 5R transmits the red laser light emitted from the laser element 2R. The lens 5G is disposed between the laser element 2G and the optical element 3G. The lens 5G transmits the green laser light emitted from the laser element 2G. The lens 5B is disposed between the laser element 2B and the optical element 3B. The lens 5B transmits the blue laser light emitted from the laser element 2B.

The plurality of support members 6*a* include a support member 6R, a support member 6G, and a support member 6B. The support member 6R is disposed on the main surface 10 of the substrate 1 and supports the laser element 2R. The support member 6G is disposed on the main surface 10 of the substrate 1 and supports the laser element 2G. The support member 6B is disposed on the main surface 10 of the substrate 1 and supports the laser element 2B. Although FIG. 4 illustrates a specific implementation in which different support members 6*a* are used for the respective laser elements 2*a*, one support member 6*a* may support each of the laser elements 2*a*.

The housing member 8 is a box-shaped member including a recessed portion 80 with an upper portion thereof being open. In the example illustrated in FIG. 4, the housing member 8 houses the substrate 1, the laser elements 2*a*, and the optical elements 3*a* therein. The laser elements 2*a* and the optical elements 3*a* may be directly disposed on the bottom surface of the housing member 8 without the substrate 1 interposed therebetween. In this case, the housing member 8 also functions as the substrate 1.

The lid 9 is disposed so as to close the upper portion of the recessed portion 80 of the housing member 8. By closing the upper portion of the recessed portion 80 of the housing member 8, the lid 9 can seal the housing member 8. Since the end surfaces of the laser elements 2*a* has a high optical density and easily collects dust, the recessed portion of the housing member 8 may be filled with gas. By filling the recessed portion 80 with gas and closing the upper portion thereof with the lid 9, the laser elements 2*a* can be sealed.

In the light source device 100*a*, the housing member 8 houses the laser elements 2*a* and the optical elements 3*a*, thereby reducing contamination of the laser element 2*a* and the optical element 3*a* by dust, liquid droplets, or the like.

Although FIG. 4 illustrates the configuration including the plurality of laser elements, optical elements, polarization elements, lenses, and support members, the above-described effects of the light source device 100*a* can also be obtained with the configuration including one laser element, one optical element, one polarization element, one lens, and one support member.

The effects of the light source device 100*a* other than those described above are similar to those in the first embodiment.

The optical elements 3*a* and the polarization elements 4*a* are housed in the housing member 8. This can reduce the sizes of the optical elements 3*a* and the polarization elements 4*a* compared with the case in which the optical elements and the polarization elements are disposed outside the package included in the light source device, because the laser lights having different polarization states can be obtained before the spread of the laser light increases. Thus, the size of the entire system can be reduced when, for example, the display device is configured.

Third Embodiment

Figure 5:
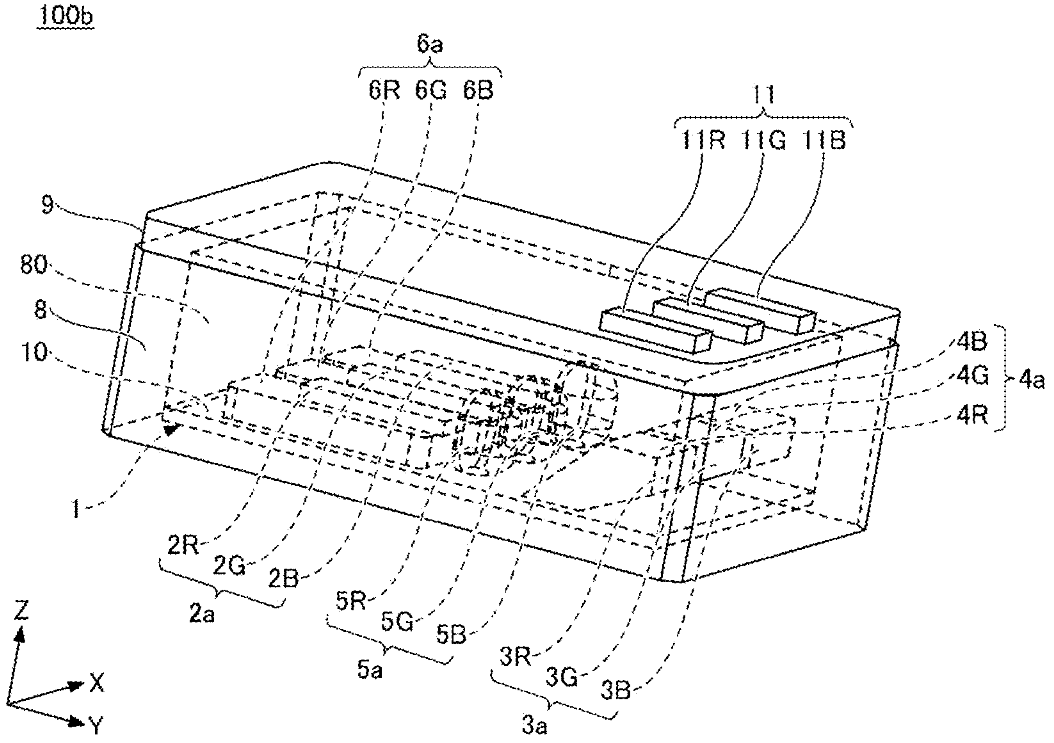
FIG. 5 schematically illustrates a perspective view of a light source device according to a third embodiment.
Figure 6:
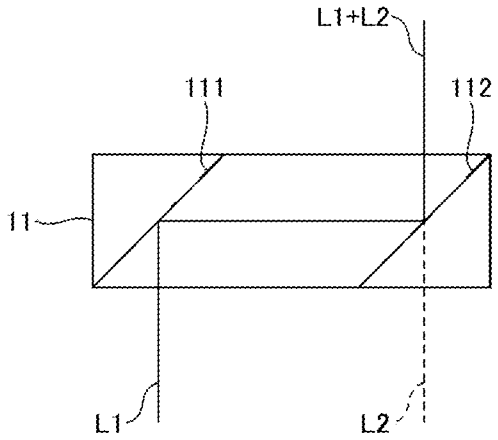
FIG. 6 schematically illustrates a first example of an optical combiner provided in the light source device according to the third embodiment.

A light source device according to a third embodiment is described with reference to FIGS. 5 and 6. FIG. 5 schematically illustrates a perspective view of a light source device 100*b* according to the third embodiment. FIG. 6 schematically illustrates a first example of an optical combiner 11 included in the light source device 100*b*.

The light source device 100*b* differs from the light source device of the second embodiment mainly in further including optical combiners 11 that combines the first and second components of the laser lights emitted from the laser elements 2*a*.

In the example illustrated in FIG. 5, the light source device 100*b* includes a plurality of optical combiners 11. The plurality of optical combiners 11 includes an optical combiner 11R, an optical combiner 11G, and an optical combiner 11B. The optical combiner 11R combines the first and second components of the laser light emitted from the laser element 2R and incident on the optical combiner 11R via the lens 5R, the optical element 3R, and the polarization element 4R. The optical combiner 11G combines the first and second components of the laser light emitted from the laser element 2G and incident on the optical combiner 11G via the lens 5G, the optical element 3G, and the polarization element 4G. The optical combiner 11B combines the first and second components of the laser light emitted from the laser element 2B and incident on the optical combiner 11B via the lens 5B, the optical element 3B, and the polarization element 4B.

In the light source device 100*b*, the optical combiners 11 combine and emit the laser lights having different polarization states, thus reducing the speckles of the laser lights emitted from the light source device 100*b* compared with the case in which the laser lights having a uniform polarization state are emitted.

In the example illustrated in FIG. 5, the optical combiners 11 are provided on the lid 9. For example, the optical combiners 11 are disposed on the upper surface (a surface on the +Z side) of the lid 9. For example, the optical combiners 11 can be fixed to the lid 9 with an adhesive. This makes it possible to downsize the light source device 100*b* because there is no need to provide a separate component to support the optical combiners 11.

Although the light source device 100*b* including the plurality of optical combiners 11 is illustrated in the example of FIG. 5, the light source device 100*b* may include one optical combiner 11 when the light source device 100*b* includes one laser element, one optical element, one polarization element, and one lens.

As the optical combiner 11, a prism can be employed which reflects one of the first component and the second component twice or more, transmits the other of the first component and the second component, and combines the first component and the second component. In the example illustrated in FIG. 6, the optical combiner 11 has a first prism surface 111 and a second prism surface 112. The optical combiner 11 reflects the first component L1 at the first prism surface 111 and the second prism surface 112. The optical combiner 11 can transmit the second component L2 at the second surface and combine the first component L1 and the second component L2. The prism can include glass, crystal, or the like having transmissivity for the first component L1 and the second component L2. A dielectric multilayer film is provided on each of the first prism surface 111 and the second prism surface 112.

Figure 7:
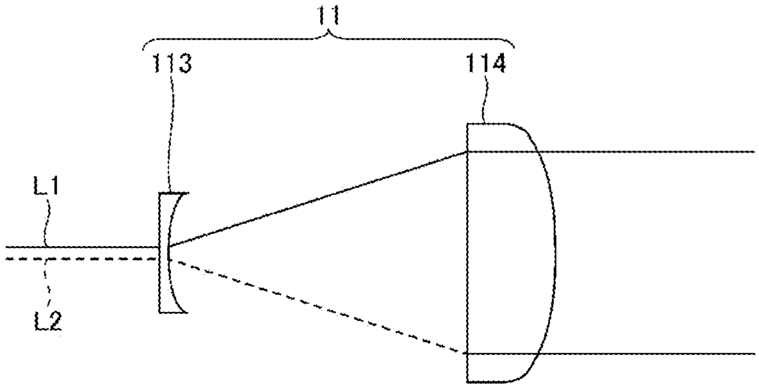
FIG. 7 schematically illustrates a second example of the optical combiner provided in the light source device according to the third embodiment.

The optical combiner 11 is not limited to the prism illustrated in FIG. 6. FIG. 7 is a schematic diagram illustrating a second example of the optical combiner 11. In the example illustrated in FIG. 7, the optical combiner 11 is a beam expander including a concave lens 113 and a convex lens 114. The beam expander can combine the incident first and second components L1 and L2 by expanding the beam diameters of the first and second components.

The concave lens 113 and the convex lens 114 can include a member made of glass, crystal, or the like having transmissivity for the first component L1 and the second component L2. The beam expander is not limited to the configuration with the concave lens 113 and the convex lens 114, and can be composed of a combination of various lenses, as long as the first component L1 and second component L2 can be combined by expanding the beam diameters thereof.

Although the configuration including the plurality of laser elements, optical elements, polarization elements, lenses, and support members is illustrated in FIG. 5, the above-described effects of the light source device 100*b* can also be obtained when the configuration includes one laser element, one optical element, one polarization element, one lens, and one support member.

In the present embodiment, a display device including the light source device 100*b* can also be provided. The display device is, for example, a projector. For example, the display device includes the light source device 100*b*, a spatial modulator that generates an image to be displayed by the display device, and a projection lens that projects the image generated by the spatial modulator. The image includes a still image and a moving image (may be referred to as video). This also applies to the case in which the term "image" is used hereinafter.

In the present embodiment, the light source device 100*b* that is compact and emits the first component L1 and the second component L2 having different polarization states is provided, whereby the display device can be downsized and the speckles derived from the laser light emitted from the display device can be reduced. In the light source device 100*b*, a prism or a beam expander may be used as the optical combiner 11, but a prism is preferably used. As described with reference to FIG. 5, the optical combiners 11 using prisms can be disposed on the upper surface of the lid 9 of the light source device 100*b*. At this time, the optical combiners 11 can be easily fixed with an adhesive, and no exterior component for supporting the optical combiners is required. Since the optical combiners 11 are disposed on the upper surface of the lid 9, the first component and the second component can be combined while the beam diameter of the laser light is relatively small. Thus, a small optical system for combining the first component and the second component is provided, allowing downsizing of the display device.

In the second and third embodiments, the plurality of laser elements 2*a* may include a plurality of laser elements each of which emits red, green, or blue laser light. That is, the plurality of laser elements 2*a* that emit laser light of the same color may be provided. This provides a speckle reduction effect by the wavelength multiplexing effect. In this case, the difference between the longest wavelength and the shortest wavelength within the same color range among the oscillation peak wavelengths of the laser lights emitted from the plurality of laser elements 2*a* may be, for example, in a range from 5 nm to 40 nm, from 5 nm to 30 nm, from 5 nm to 20 nm, or from 5 nm to 10 nm. However, it is not always necessary to compare the laser light having the longest wavelength with the laser light having the shortest wavelength, and the speckle reduction effect can be obtained by the wavelength multiplexing effect as long as laser light is included which has a wavelength such that the difference between the reference wavelength and the oscillation peak wavelength of the laser light is 20 nm or less, 15 nm or less, 10 nm or less, or 5 nm or less.

Fourth Embodiment

Figure 8:
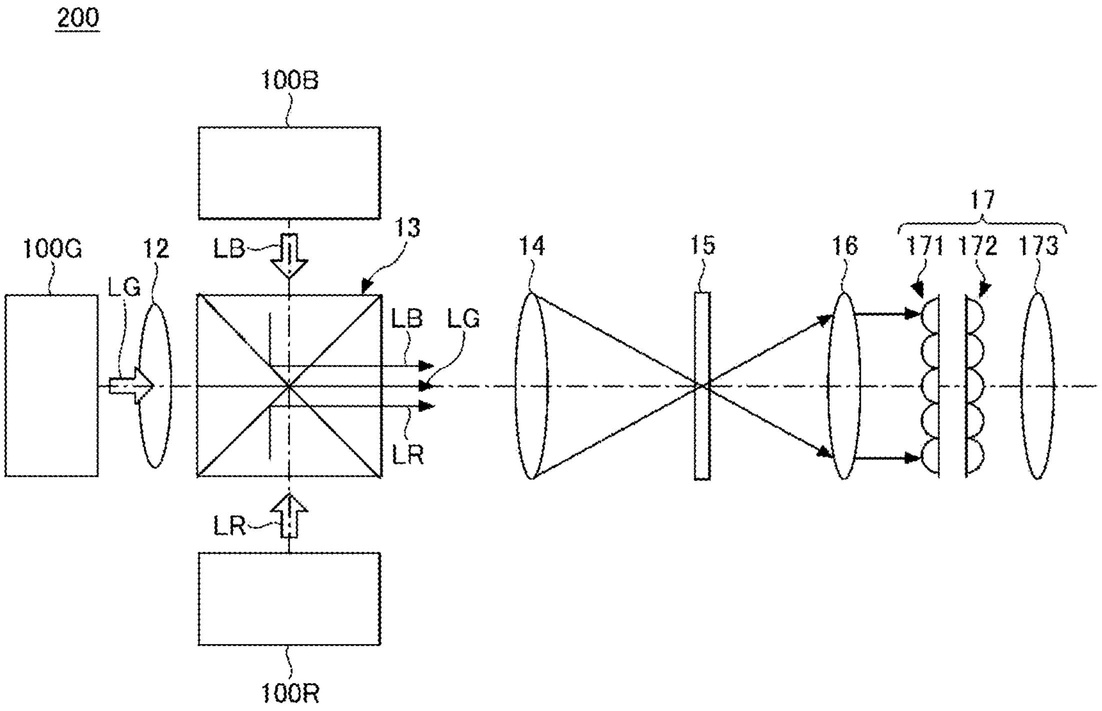
FIG. 8 schematically illustrates a configuration of a display device according to a fourth embodiment.

A display device according to a fourth embodiment is described with reference to FIG. 8. FIG. 8 schematically illustrates a configuration of a display device 200 according to the fourth embodiment.

The display device 200 includes three or more light source devices according to the embodiment. Three or more light source devices emit at least red, blue, and green laser lights. In the example illustrated in FIG. 8, the display device 200 includes a light source device 100R, a light source device 100G, a light source device 100B, a first lens 12, a dichroic prism 13, a second lens 14, a light diffusion plate 15, a third lens 16, and a light uniformization optical system 17. The light uniformization optical system 17 includes a first lens array 171, a second lens array 172, and a fourth lens 173.

The display device 200 may further include a spatial modulator that generates an image to be displayed by the display device 200, a projection lens that projects the image generated by the spatial modulator, and the like. The display device 200 may further include a combining optical system that combines differently polarized lights emitted from the light source devices 100R, 100G, and 100B. The light source devices 100R, 100G, and 100B may be arranged in an array in a predetermined direction.

The light source devices 100R, 100G, and 100B correspond to the light source devices according to three or more of the embodiments. The light source device 100R emits red laser light LR. The light source device 100G emits green laser light LG. The light source device 100B emits blue laser light LB. Each of the light source devices 100R, 100G, and 100B can have substantially the same configuration as the light source device 100*b* described above, except for the color of the laser light to be emitted. In this embodiment, the light source device 100R includes a plurality of laser elements that emit red laser light LR. The light source device 100G includes a plurality of laser elements that emit green laser light LG. The light source device 100B includes a plurality of laser elements that emit blue laser light LB.

The first lens 12 transmits the laser light LG emitted by the light source device 100G. The dichroic prism 13 combines the laser light LR from the light source device 100R, the laser light LG from the first lens 12, and the laser light LB from the light source device 100B, and emits the combined laser light toward the second lens 14.

The second lens 14 transmits the laser lights LR, LG, and LB combined by the dichroic prism 13. The light diffusion plate 15 diffuses the laser lights LR, LG, and LB transmitted through the second lens 14. The laser lights LR, LG, and LB diffused by the light diffusion plate 15 pass through the third lens 16 and enter the light uniformization optical system 17. The laser lights LR, LG, and LB are transmitted through the first lens array 171, the second lens array 172, and the fourth lens 173 in the light uniformization optical system 17 and thus the illuminances of the laser lights LR, LG, and LB are substantially uniformized. Then, the laser lights LR, LG, and LB can be emitted from the light uniformization optical system 17. Although the beam diameters of the first component L1 and the second component L2 are different as illustrated in FIGS. 2 and 3, the beam diameters of the laser lights LR, LG, and LB including the first component L1 and the second component L2 can also be made uniform when the laser lights LR, LG, and LB pass through the light uniformization optical system 17.

The display device 200 can be downsized as the display device 200 includes the light source devices 100R, 100G, and 100B that are compact and emit the first component L1 and the second component L2 having different polarization states. The display device 200 can reduce the speckles derived from the laser lights emitted from the light source devices 100R, 100G, and 100B in the image displayed by the display device 200. The display device 200 can further be downsized by further providing the optical combiners 11 using prisms in the light source devices 100R, 100G, and 100B. In the display device 200, a plurality of laser lights having different oscillation peak wavelengths in the same color range are emitted from the light source device 100R, whereby the speckle reduction effect by wavelength multiplexing can be obtained. The same applies to the light source devices 100G and 100B.

In the display device 200, the effects other than those described above for the light source devices 100R, 100G, and 100B are the same as the effects in the first embodiment.

Fifth Embodiment

Figure 9:
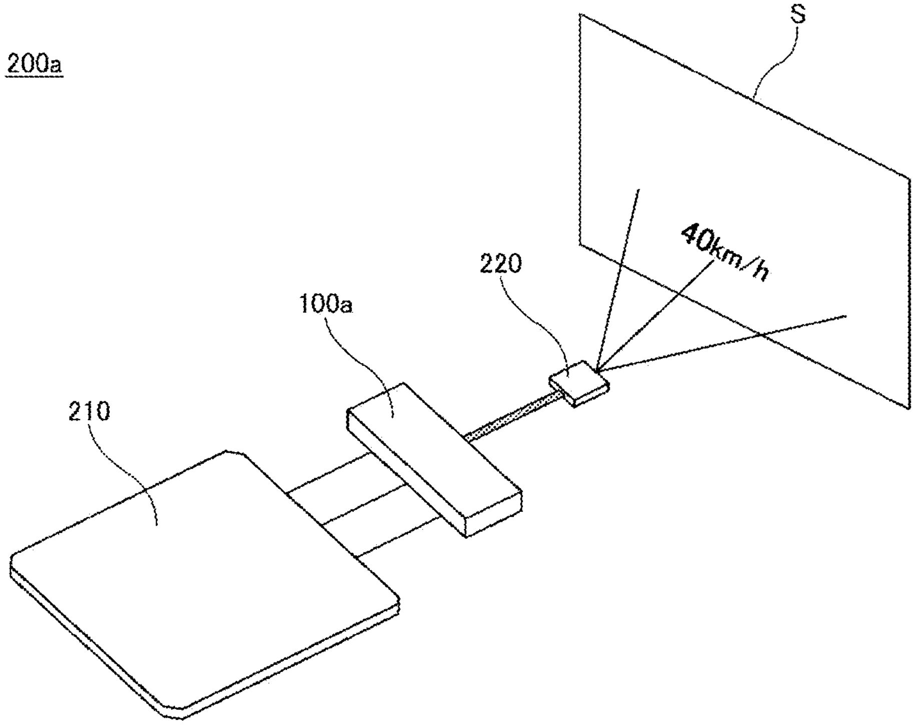
FIG. 9 schematically illustrates a perspective view of a display device according to a fifth embodiment.

A display device according to a fifth embodiment is described with reference to FIG. 9. FIG. 9 schematically illustrates a perspective view of a configuration of a display device 200*a* according to the fifth embodiment.

The display device 200*a* includes a laser element driver 210, the light source device 100*a*, and an optical scanning mechanism 220. For example, the display device 200*a* may be a head-up display mounted on a moving body. Examples of the moving body include vehicles such as automobiles or trains, aircrafts, ships, and the like.

The laser element driver 210 supplies a drive signal to each of the laser elements 2R, 2G, and 2B included in the light source device 100*a* and drives each of the laser elements 2R, 2G, and 2B.

The light source device 100*a* emits red, green, and blue laser lights. The display device 200*a* may include the light source device 100*b* or a plurality of light source devices 100 that emit laser lights of different colors, for example, red, green, and blue laser lights, instead of the light source device 100*a*.

The optical scanning mechanism 220 scans the laser light from the light source device 100*a*, on a display surface S. The display surface S is, for example, a front windshield of an automobile. For example, the optical scanning mechanism 220 is a micro electro mechanical systems (MEMS) mirror capable of swinging, around a predetermined swing axis, a movable portion including a reflection surface. The optical scanning mechanism 220 scans the laser light incident thereon from the light source device 100*a* and reflected by the reflection surface, on the display surface S by swinging the movable portion. The optical scanning mechanism 220 can scan the laser light in substantially orthogonal biaxial directions in a plane along the display surface S by swinging the movable portion around two swing axes substantially orthogonal to each other. However, the optical scanning mechanism 220 is not limited to the MEMS mirror as long as the laser light from the light source device 100*a* can be scanned, and a galvanometer mirror, a polygon mirror, or the like may be used.

The display device 200*a* can display an image via the display surface S by causing the optical scanning mechanism 220 to scan the laser light from the light source device 100*a* on the display surface S. For example, as illustrated in FIG. 9, the display device 200*a* can display a virtual image of an image including information such as a traveling speed of an automobile on which the display device 200*a* is mounted, so that the driver of the automobile can visually recognize the virtual image. The display device 200*a* can display a two-dimensional image via the display surface S by causing the optical scanning mechanism 220 to scan the laser light from the light source device 100*a* in substantially orthogonal biaxial directions in a plane along the display surface S.

In the present embodiment, the light source device 100*a* that is compact and emits the first component L1 and the second component L2 having different polarization states is provided, thus allowing downsizing of the display device 200*a*. In the image displayed by the display device 200*a*, the speckles derived from the laser light emitted from the light source device 100*a* can be reduced. The display device 200*a* may include the light source devices 100R, 100G, and 100B that emit red, green, and blue laser lights, respectively. The light source devices 100R, 100G, and 100B emit laser lights having different oscillation peak wavelengths in the same color range of each color, whereby the speckle reduction effect by wavelength multiplexing can also be obtained.

In the display device 200*a*, the effects other than those described above for the light source device 100*a* are the same as the effects in the first embodiment.

The display device according to the fifth embodiment can be used not only for the above-described applications but also for a head-mounted display.

While preferred embodiments have been described in detail above, the disclosure is not limited to the above-described embodiments, various modifications and substitutions can be made to the above-described embodiments without departing from the scope described in the claims.

The number, quantity, and the like used in the description of the embodiments all are exemplified to specifically describe the technology of the present disclosure, and the present disclosure is not limited to the numbers exemplified. In addition, the connection relationship between the components is exemplified for specifically describing the technique of the present disclosure, and the connection relationship for realizing the function of the present disclosure is not limited thereto.

Since the light source device and the display device according to the present disclosure are compact and capable of reducing speckles, they can be suitably used for projectors using laser light, head-mounted displays, rear projectors, head-up displays, and the like.

The invention claimed is:

1. A light source device comprising:

a substrate;

a laser element disposed on a main surface of the substrate and configured to emit laser light;

an optical element disposed on the main surface of the substrate and in an optical path of the laser light; and a polarization element disposed on the optical element, wherein the optical element has a first surface that reflects in a first direction a first component of the laser light that is incident onto the optical element from the laser element, and a second surface that reflects in the first direction a second component of the laser light that is incident onto the optical element from the laser element and transmitted through the first surface, and the first component of the laser light reflected by the first surface is not transmitted through the polarization element and the second component of the laser light reflected by the second surface is transmitted through the polarization element.

2. The light source device according to claim 1, wherein an acute angle formed by the first surface and the main surface of the substrate is a first angle, and an acute angle formed by the second surface and the main surface of the substrate is a second angle smaller than the first angle.

3. The light source device according to claim 1, further comprising:

a lens disposed between the laser element and the optical element.

4. The light source device according to claim 3, further comprising:

a support member disposed on the main surface of the substrate and supporting each of the laser element and the lens, wherein the support member comprises a first region in which the laser element is disposed and a second region in which the lens is disposed, and in a normal direction of the main surface, a first height of a first upper surface of the first region with respect to the main surface and a second height of a second upper surface of the second region with respect to the main surface are different, and a central axis of the laser light emitted from the laser element is aligned with an optical axis of the lens.

5. The light source device according to claim 1, wherein the first surface is a mirror having a predetermined reflectance, and the second surface is a total reflection mirror or a dichroic mirror.

6. The light source device according to claim 5, wherein the second surface is provided with a metal film or a dielectric multilayer film.

7. The light source device according to claim 1, wherein the polarization element is a half-wave plate.

8. The light source device according to claim 1, further comprising:

a housing member housing the laser element and the optical element; and a lid sealing the housing member.

9. The light source device according to claim 8, further comprising:

an optical combiner configured to combine the first component and the second component of the laser light that are transmitted through the lid.

10. The light source device according to claim 9, wherein the optical combiner is a prism provided on the lid.

11. The light source device according to claim 1, further comprising:

an optical combiner configured to combine the first component and the second component of the laser light.

12. The light source device according to claim 1, wherein a gap space is provided between the main surface of the substrate and the second surface of the optical element disposed on the main surface.

13. The light source device according to claim 1, further comprising:

an optical element support member disposed between the main surface of the substrate and the second surface of the optical element disposed on the main surface.

14. The light source device according to claim 1, wherein a beam diameter of the first component of the laser light reflected by the first surface is different from a beam diameter of the second component of the later light transmitted through the polarization element.

15. A display device comprising:

the light source device according to claim 1; and an optical combiner configured to combine the first component and the second component of the laser light emitted from the light source device.

16. A display device comprising:

three or more light source devices each being the light source device according to claim 1, wherein the three or more light source devices emit at least red, blue, and green laser lights.

17. A light source device comprising:

a substrate;

first and second laser elements disposed on a main surface of the substrate and configured to emit first and second laser lights of different wavelengths, respectively;

first and second optical elements disposed on the main surface of the substrate and in optical paths of the first and second laser lights, respectively; and first and second polarization elements disposed on the first and second optical elements, respectively, wherein each of the first and second optical elements has a first surface that reflects in a first direction a first component of a laser light that is incident thereon, and a second surface that reflects in the first direction a second component of the laser light that is incident thereon and transmitted through the first surface, and the first component of the laser light reflected by the first surface is not transmitted through a corresponding one of the first and second polarization elements and the second component of the laser light reflected by the second surface is transmitted through the corresponding one of the first and second polarization elements.

18. The light source device according to claim 17, wherein an acute angle formed by the first surface of the first optical element and the main surface of the substrate is different from an acute angle formed by the first surface of the second optical element and the main surface of the substrate.

19. The light source device according to claim 17, further comprising:

a third laser element disposed on the main surface of the substrate and configured to emit third laser light of which wavelength is different from those of the first and second laser lights;

a third optical element disposed on the main surface of the substrate and in an optical path of the third laser light; and a third polarization element disposed on the third optical element, wherein the third optical element has a first surface that reflects in a first direction a first component of the third laser light that is incident thereon, and a second surface that reflects in the first direction a second component of the third laser light that is incident thereon and transmitted through the first surface, and the first component of the third laser light reflected by the first surface is not transmitted through the third polarization element and the second component of the third laser light reflected by the second surface is transmitted through the third polarization element.

20. The light source device according to claim 19, wherein an acute angle formed by the first surface of the first optical element and the main surface of the substrate, an acute angle formed by the first surface of the second optical element and the main surface of the substrate, and an acute angle formed by the first surface of the third optical element and the main surface of the substrate are different from each other.

* * * * *